Patented Nov. 4, 1952

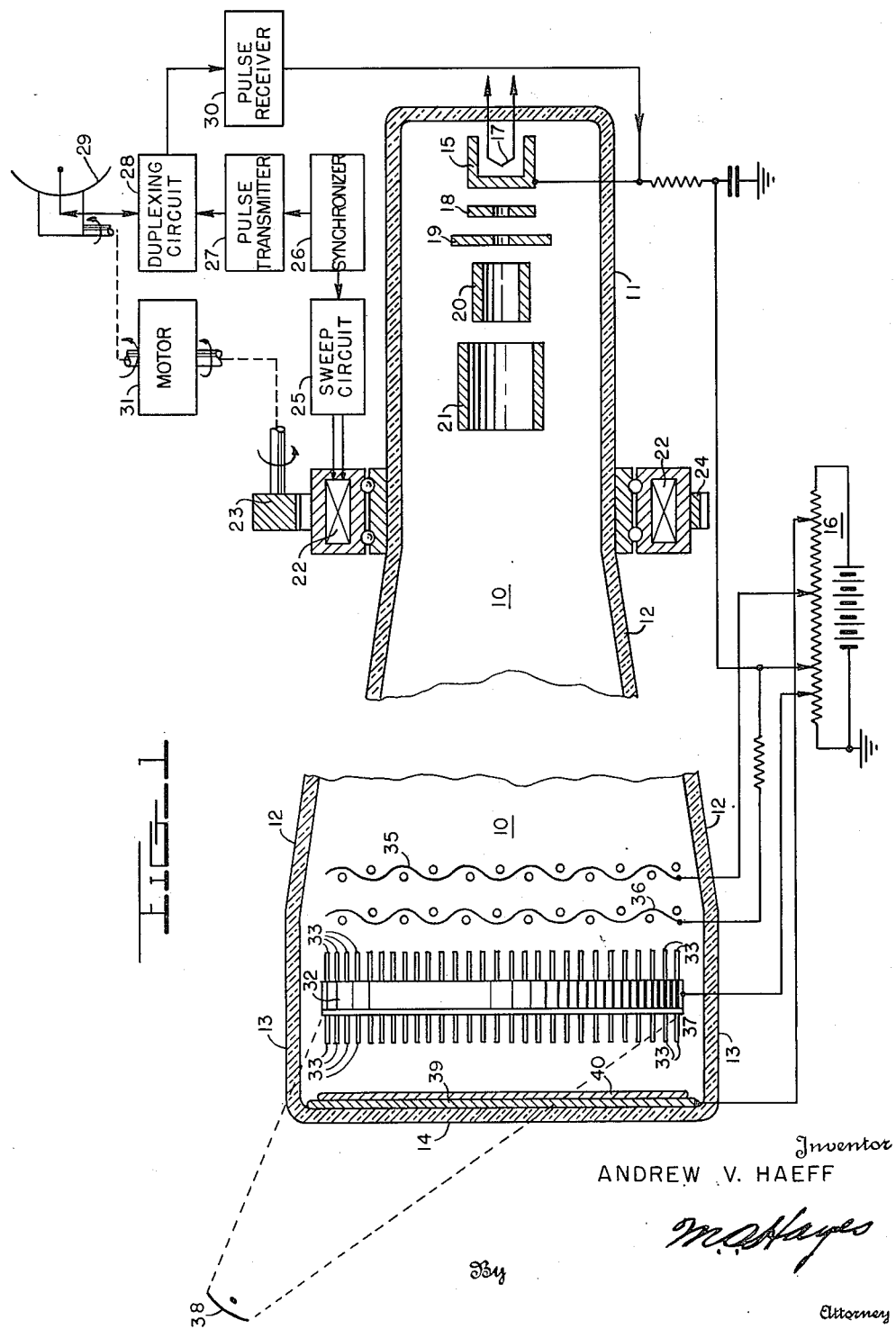

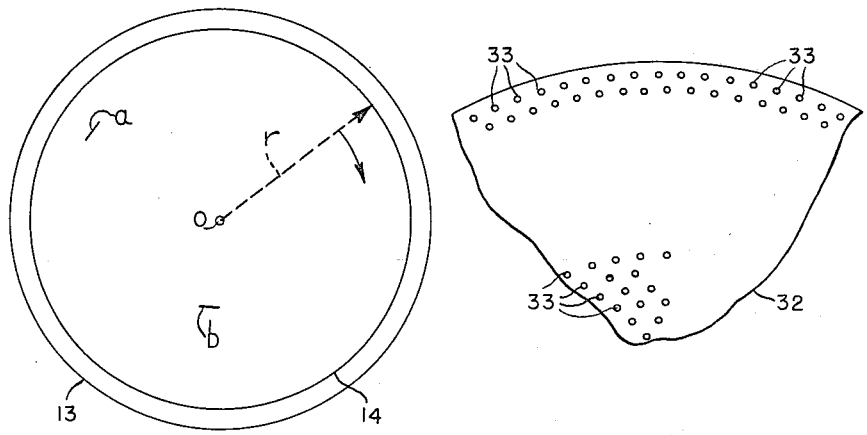
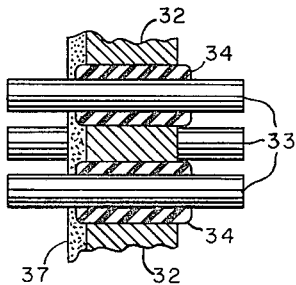

2,617,073

UNITED STATES PATENT OFFICE 2,617,073

SIGNAL INTEGRATING TUBE FOR RADAR

Andrew V. Haeff, Washington, D. C.

Application January 10, 1947, Serial No. 721,334

6 Claims. (Cl. 315—11)

(Granted under the act of March 3, 1883, as amended April 30, 1928; 370 O. G. 757)

This invention relates to electronic devices and more particularly to a device for increasing the signal to noise ratio of an energy train.

The degree of accuracy obtainable when interpreting the transmission of intelligence through the medium of an energy train is governed by the ability of an individual to differentiate the true signals of the energy train from the spurious signals thereof, through oral or visual means. The degree of accurate interpretation is in proportion to the signal to noise ratio of the energy train. The foregoing may be more readily understood with reference to conventional radio echo ranging apparatus wherein an energy train, having cyclical energy components, echo signals from remote objects detected by the apparatus, non-cyclical energy components, and spurious energy signals produced by noise generated in the receiving channels of the apparatus or from external interference, is received and interpreted to obtain range indications of the remote objects. The energy train is applied to a cathode ray indicating device to modulate the electron beam thereof and to produce a visual indication on the viewing screen of the device which is an instantaneous picture showing the proportional relationship in space of remote objects with respect to the location of the ranging apparatus. Since the non-cyclical spurious energy signals also modulate the electron beam indications thereof will appear on the viewing screen reducing the clearness of the true echo indications. The accuracy of range indications obtained from the foregoing presentation is therefore governed by the ability of the operator to differentiate between the true echo indications and the spurious energy indications. By increasing the signal to noise ratio of the energy train a proportional increase in accuracy of interpretation thereof is obtained.

It is therefore an object of the present invention to provide novel means for increasing the signal to noise ratio of an energy train.

Another object is to provide a novel electronic device constructed in such a manner to selectively amplify only certain energy components of an energy train.

Another object is to provide a novel electronic device designed to discriminate against spurious energy components of an energy train.

Still another object of the present invention is to provide a novel electronic device designed in such a manner to selectively integrate an energy train and to produce an indication thereof having improved signal to noise ratio characteristics.

Still another object is to provide a novel electronic device including means responsive to cyclical deflection of an electron beam modulated in accordance with an energy train having cyclical and non-cyclical energy components to additively store energy in response to energization by said beam when modulated in accordance with said cyclical energy components while discriminating against additive storage of energy in response to energization by said beam modulated in accordance with said non-cyclical energy components.

Still another object is to provide a novel electronic device including integrating means positioned in the sweep locus of an energy train modulated electron beam and means producing an indication of the energy train having an improved signal to noise ratio determined by the integrating means.

Still another object is to provide an electronic device of the following character with the integrating means designed in such a manner as to produce an improvement in signal to noise ratio irrespective of the type of sweep locus employed in connection therewith.

Other objects and features of the present invention will appear more fully hereinafter from the following detailed description when considered in connection with the accompanying drawings which discloses one embodiment of the invention. It is to be expressly understood, however, that the drawings are designed for purposes of illustration only and are not to be considered as a definition of the limits of the invention, reference for the latter purpose being added to the appended claims.

In the drawings, wherein similar reference characters denote similar elements throughout the several views:

Figure 1 is a diagrammatic showing, partly in section, of an electronic device constructed in accordance with the principles of the present invention, in connection with a conventional radio echo apparatus;

Figure 2 is a diagrammatic illustration of the indication produced by the device as shown in Figure 1;

Figure 3 is a plan view of a sector of an element included in the device disclosed in Figure 1, and Figure 4 is an illustration, in section, of a portion of the element disclosed in Figure 3.

In the application of Andrew V. Haeff, Serial Number 721,333, filed January 10, 1947, for Signal Integration Tube, means for increasing the signal to noise ratio of an energy train having cyclical and non-cyclical energy components through a process of energy integration is disclosed. More particularly, the aforementioned application discloses an electronic device including means producing an electron beam modulated in accordance with an energy train having cyclical and non-cyclical energy components and means for cyclically deflecting the beam in synchronism with the cyclical energy components of the energy train. An array of energy storage elements is positioned in the deflection locus of the electron beam for integrating the energy train and means are provided for producing an indication of the energy train in accordance with the integrated energy. More particularly, the storage element comprise small condensers designed to have a discharge time constant greater than the period of the cyclical deflection of the electron beam. Due to the synchronization between the beam deflection and the cyclical energy components the condensers additively store energy in response to energization by the cyclical energy components while discriminating against additive storage of energy in response to energization by the non-cyclical energy components. It is contemplated by the present invention to employ the foregoing means for increasing the signal to noise ratio of an energy train in connection with novel means to provide an electronic device having an integrating element or energy storage means, positioned in the sweep locus of an energy train modulated electron beam, to produce an indication of the energy train characterized with a further increase in signal to noise ratio, with the integrating element designed in such a manner as to produce the novel results irrespective of the type of sweep locus employed therewith. An electronic device embodying the principles of the present invention may be readily employed in connection with specialized radio echo ranging apparatus to increase the signal to noise ratio of the indications produced thereby. For example, in the application of Robert M. Page, Serial No. 459,010, filed September 19, 1942, for Radio Echo Apparatus, a system is disclosed to produce a plan position indication of an area extending 360° about the apparatus from which range and direction indications of the remote objects included within such area are obtained. To produce an indication of this type, it is necessary that the sweep locus of the electron beam describe an area extending 360° about the center of the viewing screen. The present invention is disclosed in connection with a radio echo ranging apparatus of the type disclosed in the aforementioned Page application for purposes of illustration only and it is to be expressly understood that the novel electronic device disclosed herein may be employed in connection with other systems to provide an increase in signal to noise ratio.

With reference more particularly to Figure 1 of the drawings, a novel electronic device constructed in accordance with the principles of the present invention is disclosed therein including an elongated envelope 10 having an end portion 11 of reduced diameter, an intermediate portion 12 of increasing diameter and an end portion 13 of enlarged diameter including a circular viewing face 14. A cathode 15 is positioned in the end portion 11 and is maintained at a suitable potential through a connection with a biasing supply 16. Cathode heater element 17 is associated with the cathode 15 and is energized from a source of current, not shown, for increasing the temperature of the cathode 15 whereby the latter produces a source of electrons. The electrons emitted from the cathode 15 are accelerated to a high velocity by means of apertured disc-like accelerating electrodes 18 and 19, and the accelerated electrons are formed to a sharp beam by cylindrical focusing electrodes 20 and 21. Accelerating electrodes 18 and 19 and focusing electrodes 20 and 21 are of conventional construction and the operations thereof are well understood by those skilled in the art.

Electron beam deflection means constructed in accordance with the aforementioned application of Robert M. Page is disclosed herein for producing a plan position indication on the viewing face 14. It is to be expressly understood however, that any type of electron beam deflection means may be employed in connection with the present invention. As shown in the drawing, the foregoing deflection means includes an annular deflection coil 22 mounted for rotation about the envelope 10 at a point forward of the focusing electrode 21. For a purpose that will appear more fully hereinafter, the deflection coil 22 is rotated through pinion 23 and annular gear 24 secured to the periphery of the deflection coil 22. A sweep circuit 25 supplies a source of saw tooth waveforms and direct current bias to the deflection coil 22. The deflection coil 22 is designed in such a manner as to produce a linearly varying electromagnetic field to radially deflect the electron beam from the center of the envelope 10 to the periphery thereof upon application of each saw tooth waveform thereto, in a direction determined by angular position of the deflection coil 22. The radial deflection of the electron beam is seen more clearly with reference to Figure 2 of the drawing wherein the viewing face 14 is disclosed having a radial trace of the electron beam shown thereon by broken radial line. Operation of the sweep circuit 25 is controlled by synchronizer 26 which also controls operation of pulse transmitter 27 of the radio echo ranging equipment. The arrangement is such that a radial sweep of the electron beam is initiated at the instant a pulse is produced at the transmitter 27. The output of the transmitter 27 is fed through a channel of a duplexing circuit 28 to the radiating elements of directional antenna 29, wherefrom a highly directive energy pulse transmission is emitted.

When the pulse transmission from antenna 29 impinges upon remote objects the energy is reflected from such objects as echo pulses. Such echo pulses are absorbed by the antenna 29, passed through a second channel of the duplexing circuit 28 to the receiver 30 wherein the echo pulses are suitably amplified. The output of the receiver 30 is applied to the cathode 15 to modulate the electron beam in intensity and velocity in accordance therewith. It is to be expressly understood therefore, that the electron beam is modulated in accordance with an energy train having cyclical energy components, determined by the number and position of remote objects in the path of the energy transmissions from the antenna 29, and non-cyclical energy components generated by noise within the receiver channels or from external interference, and moreover, that the electron beam is radially deflected in synchronism with the cyclical energy components of the energy train. By rotating the antenna 29 and the deflection coil 22 in synchronism, through suitable connections with a motor 31, the electron beam is modulated in accordance with energy trains having cyclical energy components determined by the presence and position of remote objects included within an area extending 360° about the antenna 29, while the radially deflected electron beam describes an area extending 360° about the longitudinal axis of the envelope 10.

As mentioned heretofore, it is contemplated by the present invention to provide means responsive to cyclical synchronous energization of an electron beam modulated in accordance with an energy train having cyclical and non-cyclical energy components to additively store energy in response to cyclical energy modulations while discriminating against additive energy storage in response to non-cyclical energy components, with the means so characterized to operate in the foregoing manner irrespective of the type of sweep locus of the electron beam. As shown in the drawing, the foregoing means include a disc-like cylindrical supporting member 32 of conductive material centrally positioned within the increased diameter portion 13 of the envelope 10 perpendicular to the longitudinal axis thereof. The diameter of the supporting member 32 is such as to provide an area at least equal to the area extending 360° about the longitudinal axis of the envelope 10 described by the rotating radially deflected electron beam. A plurality of storage elements 33, constructed of conductive material, are supported by the member 32 perpendicular to the faces thereof. The storage elements 33 are positioned in close proximity throughout the entire face area of the supporting member 32, and each of the storage elements 33 extends beyond the faces of the member 32 and terminates an equal distance therefrom. Each of the storage elements 33 is insulated from the supporting member by a high resistance material 34. The foregoing construction is shown more clearly in Figures 3 and 4 of the drawings. In Figure 3, an end view of a sector of the supporting member 32 is shown, including a plurality of storage elements 33 positioned in close proximity throughout the entire face area thereof at right angles thereto. An enlarged sectional view of a portion of the supporting member 32 is disclosed in Figure 4. It can be seen from this figure that each of the storage elements 33 is separated from the supporting member 32 by high resistance material 34. In accordance with the principles disclosed in the aforementioned Haeff application, each of the storage elements 33 in combination with associated high resistance material 34 and adjacent portions of supporting member 32 form a small capacitance. The high resistance material 34 is an imperfect insulator having a leakage conductance of such value as to provide a discharge time constant for the capacitances that is greater than the period of the cyclically deflected electron beam.

With further reference to Figure 1 of the drawings, mesh wire grid 35, of circular area, maintained at positive potential through a connection to the biasing supply 16, and mesh wire grid 36, also a circular area, maintained at the potential of the cathode 15, are positioned in the path of the electron beam forward of the supporting member 32 and the storage elements 33. The arrangement is such that only electrons that receive higher than average acceleration will pass through the grids 35 and 36 and impinge upon the storage elements 33.

Whenever the modulated electron beam impinges upon a storage element 33 a number of electrons, determined by the intensity and velocity modulation of the electron beam during the time of impact, will collect thereon, to charge the storage element to a negative potential. Such negative charge will dissipate to the supporting member 32 in accordance with the discharge time constant determined by the imperfect insulating material 34. Therefore, since the radial sweep of the electron beam cyclically occurs in synchronism with the cyclical energy components of the energy train and since the leakage conductance of the high resistance material 34 is selected to provide a discharge time constant greater than the period of the cyclically electron beam sweep, the storage elements 33 energized by the electron beam modulated in accordance with cyclical energy components are additively charged with negative potential. Furthermore, since the noncyclical energy components are not synchronized with the cyclical deflection of the electron beam, storage elements energized by the electron beam modulated in accordance with non-cyclical energy components will not receive an additive potential charge. It is to be expressly understood therefore, that the storage elements 33, in combination with the supporting member 32 and the insulating material 34, comprise a plurality of means, positioned in close proximity throughout an area equal to the maximum sweep locus area of the electron beam, determined by the dimensions of the envelope 10, for additively storing negative potential in response to cyclical energy components of the energy train while discriminating against additive storage of negative potential in response to non-cyclical energy components.

Means are also provided by the present invention for producing a visual indication of the energy train in accordance with the negative potential stored by the storage elements 33. As shown in Figure 1, the foregoing means includes a film 37 of light responsive electron emissive material, such as selenium for example, carried by the face of the supporting member 32 adjacent the viewing face 14. As shown more clearly in Figure 4, the film 37 extends over the entire face area of the member 32 except for the areas occupied by the storage elements 33. A source of ultraviolet light 38 or its equivalent is positioned outside the envelope 10 and is provided for uniformly illuminating the light responsive electron emissive film 37. However, the number of electrons emitted from the film 37 is controlled by the negative potential stored by the storage elements 33. A metallic film 39, of semi-transparent material, which may comprise a thin silver coating maintained at high positive potential through a connection to the biasing supply 16, is provided on the inner surface of the viewing face 14. A film 40 of semi-transparent fluorescent material, such as willemite for example, is positioned on the film 39. With the foregoing arrangement, electrons emitted from the light responsive electron emissive film 37, collect on the metallic film 39 and effect the fluorescent film 40 to produce a light indication, visible on the viewing face 14, of an intensity determined by the number of electrons emitted from the film 37. An indication is thus produced on the viewing face 14 in accordance with the negative potential stored by the storage elements 33. Since the negative potential stored by the storage elements 33 in response to energization by cyclical energy components of the energy train is an addition of a plurality of applied cyclical energy components, a small number of electrons are emitted from the film 37 adjacent such energized storage elements, whereas, the storage elements energized by non-cyclical energy components will not maintain substantial additive charges of negative potential and a comparatively larger number of electrons will be emitted from the film 37 adjacent the storage elements energized in the latter manner. The indication produced on the film 40 of fluorescent material, as seen on the viewing face 14, therefore includes extremely dark areas corresponding to cyclical energy components and substantially uniformly lighted areas in accordance with the non-cyclical energy components. An indicator having the foregoing characteristics provides a greater contrast between the cyclical and non-cyclical energy component thereby enabling an individual to interpret the energy train with an increased degree of accuracy.

In operation, the antenna 29 and the deflection coil 22 are rotated in synchronism so that the directional periodic pulse energy emission impinges on all remote objects included within an area extending 360° about the antenna, and so that the radially deflected electron beam is rotated throughout 360° about the longitudinal axis of the envelope 10, the electron beam is modulated throughout such area of rotation in accordance with energy trains having cyclical energy components determined by the number and position of remote objects in the area scanned by the directional periodic pulse energy emission from the antenna 29. The electrons of the modulated, radially deflected rotated electron beam, having higher than average velocity pass through the wire mesh grids 33 and 36 and impinge upon the storage elements 33. The storage elements 33 energized by the electron beam modulated in accordance with cyclical energy components, the echo pulses reflected from remote objects, additively store energy, while substantially no additive storage of energy results upon energization by the electron beam modulated in accordance with non-cyclical energy components, spurious energy signals produced by noise generated within the channels of the receiver 30 or from external interference. The electrons emitted from the film 37 under the illumination of the ultra-violet light 38 and in accordance with the energy stored by the storage elements 33 pass through the fluorescent film 40 and collect on the film 39. A visual indication is produced on the film 40 in accordance with the electron flow therethrough. Since the electron beam is modulated in accordance with the remote objects positioned within an area extending 360° about the antenna 29, and since the radially deflected electron beam rotates in synchronism with the antenna 29, the indication on the film 40 as seen on the viewing face 14, is a presentation of the area extending 360° about the antenna 29. Such an indication is diagrammatically shown in Figure 2, wherein extremely dark areas a and b represent remote objects correspondingly positioned about the antenna 29. Indications a and b are of extremely dark area with respect to the remaining portion of the indication since such indications are produced by additively stored energy in response to cyclical energy components whereas the remaining portion of the indication is produced by non-cyclical energy components.

There is thus provided by the present invention a novel electronic device for integrating an electron beam modulated energy train having cyclical and non-cyclical energy components and for producing an indication of the energy train having improved signal to noise ratio characteristics. The means for producing the process of integration and the means for producing an indication in accordance therewith are designed in such a manner as to operate and produce the foregoing results irrespective of the character of sweep locus of the electron beam employed.

Although only one embodiment of the invention has been disclosed and described herein it is to be expressly understood that various changes and substitutions may be made therein without departing from the spirit of the invention as well understood by those skilled in the art. For example, the electronic device may be employed in connection with devices other than the radio echo ranging apparatus disclosed herein for increasing the signal to noise ratio of an energy train having cyclical and non-cyclical energy components. Reference, therefore, will be had to the appended claims for a definition of the limits of the invention.

The invention described herein may be manufactured and used by or for the Government of the United States of America for governmental purposes without the payment of any royalties thereon or therefor.

What is claimed is:

1. An apparatus for increasing the signal to noise ratio of an energy train having cyclical and non-cyclical energy components comprising a plurality of energy storage elements, electron discharge means cyclically operative in synchronism with said cyclical energy components to selectively charge said storage elements in accordance with said energy train and a uniformly illuminated light and energy responsive electron discharge means mounted in close proximity to said storage elements for emitting electrons in accordance with the energy charge on said storage elements.

2. In combination, means producing a beam of electrons, means cyclically deflecting said beam, a plurality of electron storage elements positioned in the deflection locus of said beam, a uniformly illuminated light and energy responsive electron emissive means mounted in close proximity to said storage elements and means uniformly illuminating the last-named means whereby electrons are emitted therefrom in accordance with electrons stored by said storage elements.

3. A device for increasing the signal to noise ratio of an energy train having cyclical and non-cyclical energy components comprising means producing an electron beam, means modulating said beam in accordance with said energy train, means cyclically sweeping said beam in synchronism with said cyclical energy components, means positioned in the sweep locus of said beam for additively storing energy in response to energization by said beam when modulated in accordance with said cyclical energy components, means including a uniformly illuminated light and energy responsive film for producing a source of electrons in accordance with the energy charge on the last named means and means responsive to said source of electrons to provide an indication of said energy train.

4. A device for increasing the signal to noise ratio of an energy train having cyclical and non-cyclical energy components comprising means producing an electron beam, means cyclically sweeping said beam in synchronism with said cyclical energy components, a plurality of electron storage means positioned in the sweep locus of said beam for additively storing electrons in response to energization by said beam when modulated in accordance with said cyclical energy components, a uniformly illuminated light and energy electron emissive film mounted in close proximity to said electron storage means to emit electrons in accordance with the electrons stored by said storage means, and means responsive to said emitted electrons to produce an indication of said energy train.

5. An apparatus for increasing the signal to noise ratio in the energy train having cyclical and non-cyclical energy components comprising means producing an electron beam, means modulating said electron beam in accordance with said energy train, means cyclically sweeping said beam in synchronism with said cyclical energy components, a plurality of electron storage elements positioned in the sweep locus of said beam for additively storing electrons in response to energization by said beam when modulated in accordance with said cyclical energy components while discriminating against additive storage of energy in response to energization by said beam modulated in accordance with said non-cyclical energy components, a uniformly illuminated light and energy electronic emissive film to emit electrons in accordance with the electrons stored by said storage means and means responsive to said emitted electrons to produce an indication of said energy trains.

6. In a cathode ray device including means producing an electron beam and means deflecting said beam, integrating means positioned in the deflection locus of said beam, said integrating means including a conductive member describing an area substantially equal to the maximum permissible deflection locus of said beam, a plurality of conductor members carried by said conductive member, means having a preselected leakage conductance insulating said conductive member from said conductor members, and a uniformly illuminated light and energy responsive film disposed on said conductive member and emitting electrons in accordance with the energy charge on said conductor members.

ANDREW V. HAEFF.

REFERENCES CITED

The following references are of record in the file of this patent:

UNITED STATES PATENTS

| Number | Name | Date |
|---|---|---|
| 1,747,988 | Sabbah | Feb. 18, 1930 |
| 1,871,357 | Brace | Aug. 9, 1932 |
| 1,935,649 | McCreary | Nov. 21, 1933 |
| 2,013,162 | McCreary | Sept. 3, 1935 |
| 2,045,984 | Flory | June 30, 1936 |
| 2,133,123 | Tihanyi | Oct. 11, 1938 |
| 2,136,105 | Jobst | Nov. 8, 1938 |
| 2,146,994 | Schroter et al. | Feb. 14, 1939 |
| 2,245,364 | Riesz et al. | June 10, 1941 |
| 2,293,899 | Hanson | Aug. 25, 1942 |
| 2,401,786 | Law | June 11, 1946 |
| 2,412,669 | Bedford | Dec. 17, 1946 |
| 2,422,295 | Eaton | June 17, 1947 |
| 2,451,000 | Smith | Oct. 12, 1948 |
| 2,451,484 | Gould et al. | Oct. 19, 1948 |